US008478906B2

(12) United States Patent
Jordan

(10) Patent No.: US 8,478,906 B2
(45) Date of Patent: *Jul. 2, 2013

(54) WIRELESS DEVICE ADDRESS BOOK UPDATES

(75) Inventor: Royce D. Jordan, Lawrenceville, GA (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 197 days.

This patent is subject to a terminal disclaimer.

(21) Appl. No.: 12/175,263

(22) Filed: Jul. 17, 2008

(65) Prior Publication Data

US 2008/0275950 A1 Nov. 6, 2008

Related U.S. Application Data

(62) Division of application No. 10/098,697, filed on Mar. 15, 2002, now Pat. No. 7,516,163.

(60) Provisional application No. 60/341,093, filed on Dec. 13, 2001.

(51) Int. Cl.
*G06F 15/16* (2006.01)

(52) U.S. Cl.
USPC ........... 709/249; 709/203; 709/217; 709/206; 709/219; 709/248; 705/1; 705/26; 455/418; 455/461; 379/354; 379/355.01

(58) Field of Classification Search
USPC ................... 709/249, 203, 17, 206, 219, 246, 709/248, 201; 705/1, 26; 455/414, 461, 412, 455/418; 379/354, 355.01, 355.04
See application file for complete search history.

(56) References Cited

U.S. PATENT DOCUMENTS

| | | | |
|---|---|---|---|
| 5,559,800 A | 9/1996 | Mousseau et al. | 370/401 |
| 6,219,694 B1 | 4/2001 | Lazaridis et al. | 709/206 |
| 6,370,546 B1 | 4/2002 | Kondo | |
| 6,374,259 B1 * | 4/2002 | Celik | 1/1 |
| 6,584,321 B1 | 6/2003 | Coan et al. | |
| 6,694,353 B2 | 2/2004 | Sommerer | |
| 6,874,037 B1 * | 3/2005 | Abram et al. | 709/248 |
| 6,996,227 B2 | 2/2006 | Albal et al. | |
| 2002/0016857 A1 | 2/2002 | Harari | |
| 2002/0049610 A1 * | 4/2002 | Gropper | 705/1 |
| 2002/0055351 A1 * | 5/2002 | Elsey et al. | 455/414 |
| 2002/0059454 A1 * | 5/2002 | Barrett et al. | 709/245 |
| 2002/0068551 A1 * | 6/2002 | Strunk et al. | 455/414 |
| 2002/0169748 A1 * | 11/2002 | Macholda | 707/1 |
| 2003/0033357 A1 * | 2/2003 | Tran et al. | 709/203 |
| 2003/0076934 A1 | 4/2003 | Albal et al. | |
| 2003/0154446 A1 | 8/2003 | Constant et al. | |
| 2004/0107236 A1 | 6/2004 | Nakagawa et al. | |
| 2005/0048958 A1 | 3/2005 | Mousseau et al. | |

* cited by examiner

*Primary Examiner* — Wing F Chan
*Assistant Examiner* — Benjamin M Thieu
(74) *Attorney, Agent, or Firm* — Woodcock Washburn LLP

(57) ABSTRACT

A system for maintaining an address book, wherein the address book includes a plurality of entries with each entry containing contact information and wherein address book updates are transmitted over a wireless network. The system includes a gateway for storing the address book and transmitting the address book updates to a wireless device.

13 Claims, 2 Drawing Sheets

WIRELESS DEVICE ADDRESS BOOK UPDATES

CROSS REFERENCE TO RELATED APPLICATIONS

This application is a divisional of U.S. patent application Ser. No. 10/098,697, filed Mar. 15, 2002, which claims the benefit of U.S. Provisional Application No. 60/341,093, filed Dec. 13, 2001, both of which are hereby incorporated by reference in their entireties.

BACKGROUND OF THE INVENTION

This Invention relates to address book updates and, in particular, to receiving address book updates over an interactive wireless communications network.

Email has become an important part of everyday life as user require a fast and efficient means of communicating. Email allows the distribution of a message to a broad group of people almost instantly. Electronic address books, which contain the users' email addresses and/or other relevant contact information, are becoming equally as important. Though different email or messaging application may have different configurations, address books are typically stored in a designated directory located on the computer or messaging device which sends and receives the email. Currently, as user of a wireless device may lose valuable time and effort if the contact information stored in a user's address book is lost or corrupted due to the wireless device failing or being defective. In certain instances, a user may be unable to access or import a prior address book when switching to a new device or different messaging application. Additionally, a user may wish to update an address book or receive a new address book on the wireless device without having to place in a cradle or physically connect the wireless device to a computer with maintains an up-to-date address book.

SUMMARY OF THE INVENTION

In general, in one aspect, the invention features a system for maintaining an address book, wherein the address book includes a plurality of entries with each entry containing contact information and wherein address book updates are transmitted over a wireless network. The system includes a gateway for storing the address book and transmitting the address book updates to a wireless device.

In general, in another aspect, the invention features a method of maintaining an address book on a wireless gateway, wherein the address book includes a plurality of entries with each entry containing contact information. The address book is created on the wireless gateway, the address book is modified, and address book updates are transmitted to a wireless device over a wireless network.

In general, in another aspect, the invention features a method of transmitting address book updates over a wireless network. An address book located on a wireless gateway is modified, wherein the address book includes a plurality of entries with each entry containing contact information, and the address book updates are transmitted to a wireless device over the wireless network.

DESCRIPTION OF THE PREFERRED EMBODIMENTS

It is to be understood that the figures and descriptions of the present invention have been simplified to illustrate elements that are relevant for a clear understanding of the present invention while eliminating, for purposes of clarity, other elements. For example, certain network details and aspects of certain messaging applications are not described herein. Those of ordinary skill in the art will recognize, however, that these and other elements may be desirable in a typical communications network. A discussion of such elements is not provided because such elements are well known in the art and because they do not facilitate a better understanding of the present invention.

The present invention allows a user to maintain an address book on a wireless gateway using a wireless device or via the Internet. The user can send address book updates to the device via the gateway. A specially-configured gateway is used to control the distribution of the address book updates among all messaging applications and wireless devices that communicate with the gateway. The invention can be used, for example, for maintaining address books for a large group of users and for archiving an address book so that the address book is available to a replacement wireless device if a wireless device is exchanged because of a device defect or failure.

The present invention allows for a centralized address book to be located on a gateway for a group of users. One person may be the administrator of the address books for the group. The administrator can update the address books via, for example, a web interface. Users in the group can then receive wireless "over the air" updates to his or her address book on, for example, a periodic basis.

Figure 1:
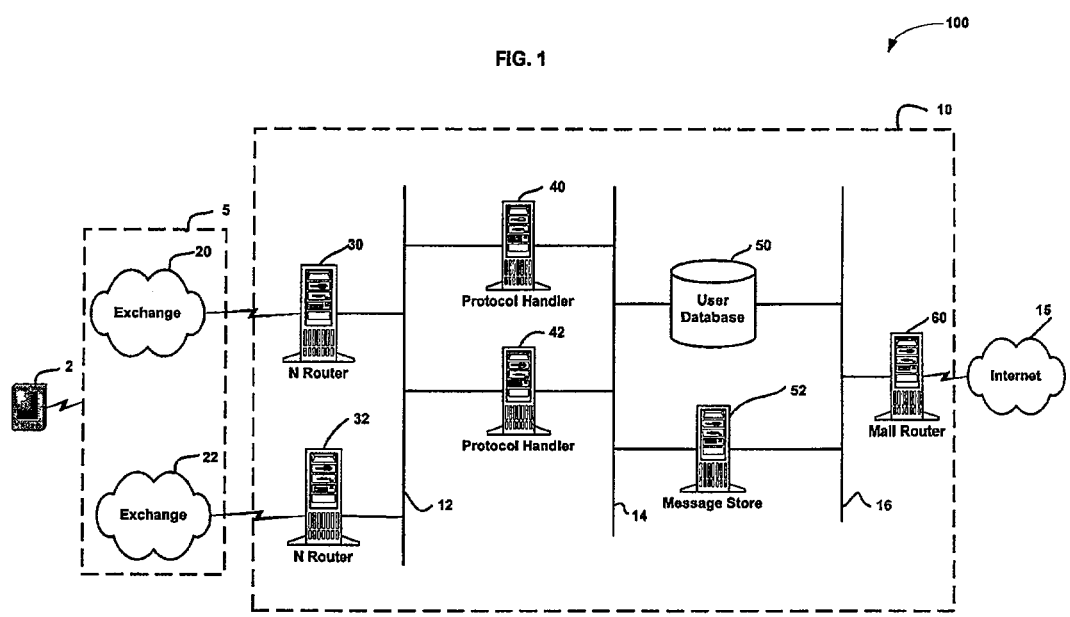
FIG. 1 is a schematic drawing of the components of an interactive wireless communications system used for maintaining an address book according to an embodiment of the present invention.

FIG. 1 shows the components of an interactive wireless communications system 100 used for maintaining an address book on a wireless gateway according to an embodiment of the present invention. The system 100 includes a wireless device 2, a wireless communication network 5, and a wireless gateway 10. An intermediate network 15, such as the Internet, may additionally be used. A wireless device 2 communicates with a wireless communication network 5 using an over-the-air protocol such as HP98 or the Blackberry protocol developed by Research in Motion Limited (RIM).

Wireless device 2 may be any wireless digital processor capable of accessing the Internet such as, for example, a mobile telephone, a personal digital assistant, or a pager such as those sold by RIM. A wireless communications network 5 may use, for example, Mobitex® technology of the Cingular Interactive Intelligent Wireless Network service provided by Cingular Wireless. The Mobitex® network is a two-way wireless data service that can be connected with other complimentary networks. A wireless data service such as the Mobitex® network includes a hierarchy of communications systems that can provide nationwide wireless service through a network of base stations and local switches under the control of higher order regional switches or exchanges.

Gateway 10 processes data received from wireless device 2 or Internet 15 for use in wireless communication network 5. The components of gateway 10 may be connected over an internal network 12, 14, 16, which may be a local area network (LAN). One or more wireless network exchanges such as Mobitex® regional switches 20, 22, which may reside at separate locations, communicate with gateway 10 through Nrouters 30, 32. The communication between regional switches 20, 22 and Nrouters 30, 32 may use, for example, an X.25 protocol. The communications received by Nrouters 30, 32 are processed by a series of protocol handlers 40, 42. Nrouters 30, 32 communicate with protocol handlers 40, 42 over internal network 12 using, for example, X-sockets. Such sockets are point-to-point, two-way software communications interfaces that direct the protocol handlers to access the internal network by creating a communications end-point or socket and returning a file descriptor with which to access that socket. Gateway 10 carries out protocol conversions between Wireless Application Protocol (WAP) and the Internet communication protocols (e.g. HTTP, TCP/IP). The underlying protocol for packaging and decoding messages sent by wireless device 2 and received by gateway 10 may be Simple Mail Transport Protocol (SMTP). The gateway 10 also performs content encoding, such as encoding of Wireless Markup Language (WML) into binary format and compilation of WML-Scripts. Gateway 10 may reside within the wireless carrier's network but may also reside within a corporate business environment.

The protocols handled by protocol handlers 40, 42, specify that message storage and internal email access may be handled by the UNIX standard Network File System (NFS) distributed file system from SUNSOFT, which allows data to be shared across the network regardless of the protocol. Each protocol handler maintains a database cache, i.e., a small, fast memory holding recently accessed data, to speed up internal network communications and to limit database access requests over the LAN.

Protocol handlers 40, 42 process information contained in user database machines, e.g., user database 50, user database backup (not shown), message store 52 and message store backup (not shown). The protocol machines communicate with the database machines over internal network 14 using, for example, X-sockets. The database machines contain an interface to content addressable memory (CAM) (not shown) for updating information, e.g., user account information and status. Multiple backup machines may be used in gateway 10, each being synchronized automatically by sockets communications.

The results of protocols processed by protocol handlers 40, 42 using data from the user database machines are communicated externally to gateway 10 via network 16. An Internet mail router 60 and Internet mail router backup (not shown) connected to internal network 16 handle inbound and outbound communications traffic with an external network such as the Internet 15, as well as X-sockets traffic. If necessary, a separate X-sockets machine and backup machine (not shown) may be added.

The gateway may be configured from a standard Santa Cruz Operation (SCO) UNIX system, with the web access program being Windows NT by Microsoft. The computer language used by the gateway components may be any suitable computer language, such as, for example, Java, Perl, C, or C++ programming language. The software implementing all or a portion of the methods disclosed herein may be stored on any type of suitable computer-readable medium such as, for example, an optical or magnetic storage medium.

A user database 50 in the gateway may be configured with a directory structure. Every user account stored in the user database has a unique identifier such as a Mobitex® Access Number. Each user account with the unique identifier may correspond to a subdirectory in the user database. The gateway may access profile information, such as user preferences, for the user stored in the user database. The gateway also uses information in the user database to ensure that the user is a valid subscriber to the wireless service, to verify that the user is authorized to access certain areas of the gateway, and to maintain billing information based on usage. The gateway performs the important function of managing the amount of data flow in the internal network and the volume of communications traffic over the wireless network, which has a limited bandwidth and which handles limited size data packets.

Gateway 10 as configured in such a wireless communications system 100 includes an address book for the user of wireless interactive device 2, e.g., in user database 50. The address book includes a plurality of entries with each entry containing contact information such as name, email address, phone number, and/or other necessary attribute information. The user may modify the address book on the gateway using an external network, such as the Internet, or the wireless device. For example, a user may change an existing address book entry, delete an existing address book entry, or add a new address book entry. The user may designate a user or group of users with different levels of access to the address book, e.g., the user or group of users may have access to modify the address book, access to view the address book, access to receive the address book or address book updates, and access to request the address book or address book updates be sent to a wireless device. For example, the user may make the address book on the gateway a personal address book and limit the address book access to just the user. Alternatively, the user may make the address book accessible to a group of users, e.g., a global or centralized address book. The user may allow only a user or a limited number of users to modify the global address book, e.g., a system administrator.

In operation, the gateway verifies whether the user has access to the address book and is authorized to modify the address book. The gateway then stores the modified contact information in the address book and handles the communications and transmission protocols to send the address book or address book update over the wireless network to the designated wireless device or devices. The gateway verifies each user's status, e.g., authorized or not authorized to receive an updated address book, based on information about each user in the user database. The gateway then determines the user's wireless device type and messaging application being used. The gateway is programmed to handle a variety of protocols for different wireless devices and different messaging applications.

The address book or address book update may be sent to the wireless device at any user-defined time such as, for example, on a periodic basis, at a request, or after modifications to the address book. When an update is being sent to a wireless device, the gateway must first determine if the user's wireless device is "on air" or capable of receiving information. If the wireless device is capable of receiving information, the gateway sends or downloads the user's updated address book to the wireless device. If the wireless device is unable to receive information, e.g., the wireless device is turned off, not activated, or outside the service range of the wireless network, the gateway may defer the download or may cancel the download. If the download is deferred, the gateway may attempt to retransmit the information at any later user-defined time e.g., attempt to resend on a periodic basis or resend when the wireless device is detected as being capable of receiving information. The address book updates may be saved or imported into any Internet-compatible email application such as Microsoft Outlook, Netscape Messenger, or Qualcomm's Eudora.

Figure 2:
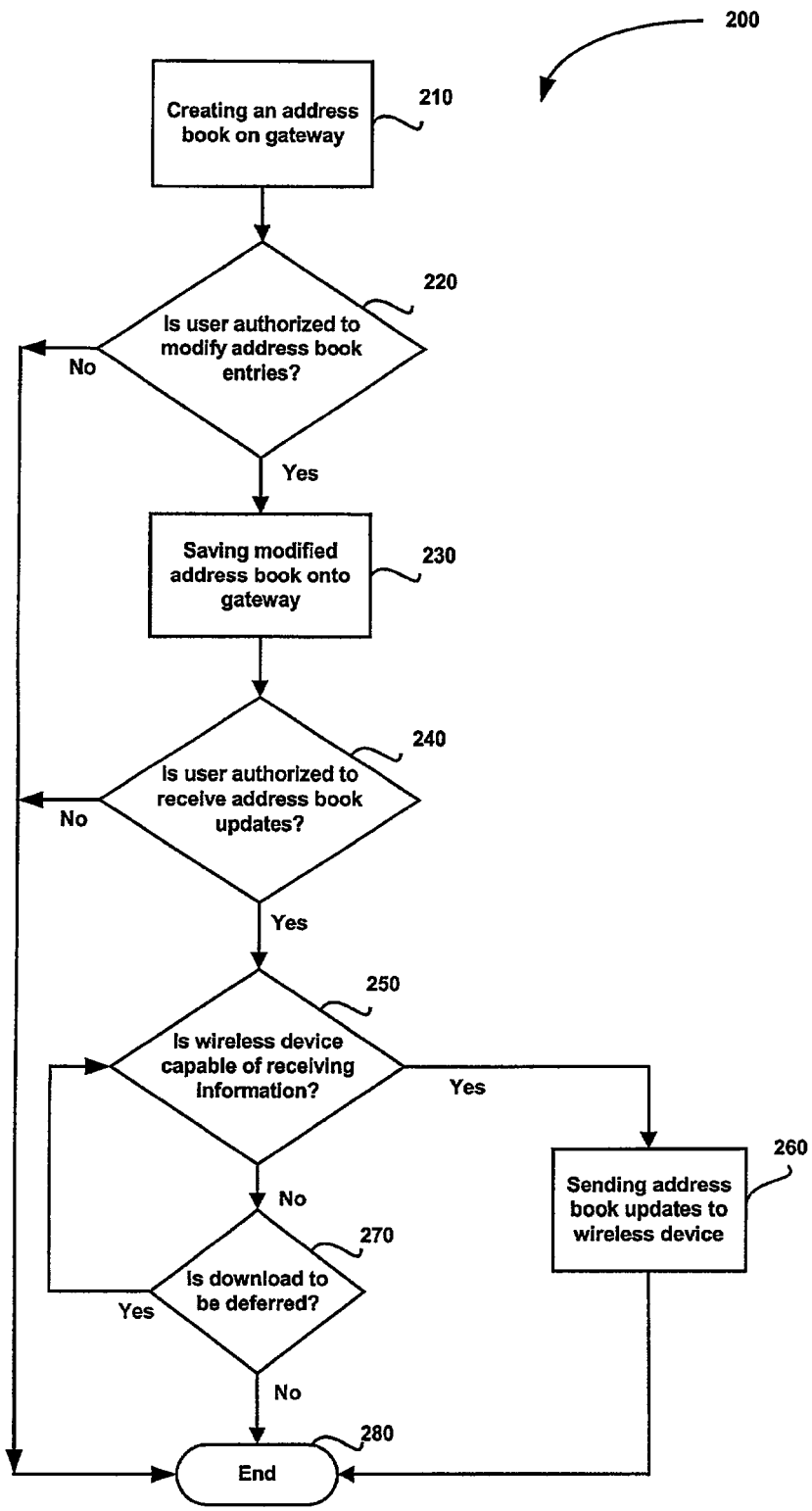
FIG. 2 is a flow diagram showing a method of maintaining an address book over a wireless network according to an embodiment of the present invention.

FIG. 2 shows a method 200 of maintaining an address book over a wireless network according to an embodiment of the present invention. The user creates an address book on the gateway (step 210) using an external network or a wireless device in communication with the wireless network. The user may designate a user or group of users with different levels of access to the address book. When a user attempts to access and modify the address book, the gateway verifies that the user is authorized (step 220). The gateway may verify the user's identity by a number of methods such as, for example, requesting a password, identifying the wireless device being used to communicate with the gateway and accessing the user database to verify the user's identity, or a combination of both. If the user is authorized, the gateway allows the user to save the modified address book onto the gateway (step 230). If not, the gateway denies the user access to modify the address book.

At any user-defined time, the address book or address book update is sent from the gateway to the wireless device. For example, the user may designate that the update be sent on a periodic basis, such as every day or every week. The user may permit the downloading of the address book at a request, such as a request by any authorized user, by a system administrator, or by the gateway. The user may specify that the address book be sent out after any modifications to the address book are saved. The user may request the gateway to compare an address book on a wireless device or devices with the address book stored on the gateway and update if there is a difference. The comparison may be run on a periodic basis, at a request, or when a wireless device is detected on the wireless network. Before sending or downloading, the gateway verifies that the user is authorized to receive the address book or address book updates (step 240). If the user is authorized, the gateway permits the downloading of the address book or address book updates. If not, the gateway denies the user the information.

Before the gateway transmits information to a wireless device, the gateway must first determine if the user's wireless device is capable of receiving information (step 250). If the wireless device is capable of receiving messages, the gateway proceeds with sending the address book or address book updates to the wireless device (step 260). If the wireless device is unable to receive messages, the gateway verifies whether the attempt to download is to be deferred or not (step 270). The subsequent download or download attempts may then occur at any user-defined time, such as on a periodic basis, at a request, or when the wireless device is detected on the wireless network. The user may also stipulate that an attempt to resend only occurs for a designated number of tries or length of time before the download is not to be deferred. If the download is not to be deferred, the gateway will cancel the download (step 280).

The address book features of the present invention are performed and controlled by the gateway. Such gateway functions are accessible by the Internet or an interactive wireless device, and do not rely on the operation of any Internet application or client application in the wireless device itself. Thus, these features may be entirely user-initiated and user-controlled. The present invention also allows a user of a wireless device to have access to and receive information from an address book without being physically connected to a computer or network where the information is being stored.

It is to be understood that the above-described embodiments are simply illustrative of the principles of the invention. Various and other modifications, alterations, and variations may be made by those skilled in the art which will embody the principles of the invention and fall within the spirit and scope of the appended claims.

What is claimed is:

1. A method comprising:
    receiving, by a database of a gateway, contact information;
    storing, by the database, the contact information in an address book on the gateway;
    storing, by a message storage device, messaging data, wherein:
        the gateway serves as a gateway between a wireless network and an external network;
        the gateway is accessible by a plurality of devices;
        the gateway receives and stores contact information between the wireless network and the external network;
        the gateway transmits data between the gateway and at least one computing device coupled to at least one of the wireless network or the external network; and
        the database and the message storage device are configured between at least one protocol handling device and at least one mail router device.

2. The method of claim 1, wherein the contact information comprises at least one of an email address, a name, a residential address, a business address, a company name, a business phone number, a home phone number, a mobile phone number, or a fax number.

3. The method of claim 1, further comprising converting data representing the contact information from a first protocol to a second protocol.

4. The method of claim 3, wherein one of the first protocol and the second protocol is a wireless application protocols.

5. The method of claim 3, wherein one of the first protocol and the second protocol is an internet communications protocol.

6. The method of claim 1, further comprising encoding the contact information.

7. The method of claim 6, wherein encoding comprises encoding wireless markup language into binary format.

8. The method of claim 1, wherein the database comprises a directory structure for associate a user with the computing device.

9. The method of claim 1, wherein at least one of the contact information or the messaging data is modifiable by the computing device.

10. The method of claim 1, further comprising updating a copy of the address book on at least one device of the plurality of devices in response to at least one of a predetermined time period, a request, or a modification to the contact information.

11. The method of claim 1, wherein the address book is modifiable via at least one of an internet or a wireless device.

12. A computer-readable storage medium, the computer-readable storage medium not being a propagating signal, the computer-readable storage medium comprising computer-readable instructions that when executed by a computer, cause the computer to effectuate operations comprising:
    receiving, by a database of a gateway, contact information;
    storing, by the database, the contact information in an address book on the gateway;
    storing, by a message storage device, messaging data, wherein:
        the gateway serves as a gateway between a wireless network and an external network;
        the gateway is accessible by a plurality of devices;
        the gateway receives and stores contact information between the wireless network and the external network;
        the gateway transmits data between the gateway and at least one computing device coupled to at least one of the wireless network or the external network; and
        the database and the message storage device are configured between at least one protocol handling device and at least one mail router device.

13. A network gateway comprising:
a database configured to receive and store contact information in an address book on the gateway; and
a message storage device configured to store messaging data, wherein:
- the gateway serves as a gateway between a wireless network and an external network;
- the gateway is accessible by a plurality of devices;
- the gateway receives and stores contact information between the wireless network and the external network;
- the gateway transmits data between the gateway and at least one computing device coupled to at least one of the wireless network or the external network; and
- the database and the message storage device are configured between at least one protocol handling device and at least one mail router device;

a protocol handler coupled to the router;
a database coupled to the protocol handler; and
a mail router coupled to the database, the mailer router coupled to a network external to the network gateway, the network gateway configure to:
receive the contact information;
store the contact information in an address book, the network gateway being accessible by a plurality of devices;
determine for each of the plurality of devices if a device is capable of accessing the contact information;
determine for each of the plurality of devices if a device is authorized to access the contact information; and
determine for each of the plurality of devices if a device is authorized to modify the contact information;
when it is determined that a device of the plurality of devices is capable of accessing and authorized to access the contact information, upon receiving a request indicative of a request from the device that is capable of accessing and authorized to access the contact information to access contact information, provide access to the contact information; and
when it is determined that a device of the plurality of devices is capable of accessing and authorized to modify the contact information, upon receiving a request indicative of a request from the device that is capable of accessing and authorized to modify the contact information to modify the contact information, provide access to the contact information for modifying the contact information.

* * * * *